(12) United States Patent
Higashida et al.

(10) Patent No.: US 12,392,892 B2
(45) Date of Patent: Aug. 19, 2025

(54) METHOD FOR INSTALLING RADIO WAVE SENSOR, RADIO WAVE SENSOR, AND ADJUSTMENT DEVICE

(71) Applicant: SUMITOMO ELECTRIC INDUSTRIES, LTD., Osaka (JP)

(72) Inventors: Nobuo Higashida, Osaka (JP); Shohei Ogawa, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/769,089

(22) PCT Filed: Sep. 7, 2020

(86) PCT No.: PCT/JP2020/033814
§ 371 (c)(1),
(2) Date: Apr. 14, 2022

(87) PCT Pub. No.: WO2021/117304
PCT Pub. Date: Jun. 17, 2021

(65) Prior Publication Data
US 2024/0103157 A1    Mar. 28, 2024

(30) Foreign Application Priority Data
Dec. 10, 2019 (JP) ................. 2019-223080

(51) Int. Cl.
| | | |
|---|---|---|
| *G01S 13/91* | (2006.01) | |
| *G01S 7/06* | (2006.01) | |
| *G01S 7/40* | (2006.01) | |
| *G08G 1/01* | (2006.01) | |

(52) U.S. Cl.
CPC .............. *G01S 13/91* (2013.01); *G01S 7/066* (2013.01); *G01S 7/4008* (2013.01); *G08G 1/0137* (2013.01)

(58) Field of Classification Search
CPC ........ G01S 13/91; G01S 7/066; G01S 7/4008; G08G 1/0137
See application file for complete search history.

(56) References Cited

U.S. PATENT DOCUMENTS

| | | |
|---|---|---|
| 6,714,156 B1 | 3/2004 | Ibrahim et al. |
| 2007/0115169 A1 | 5/2007 | Kai et al. |
| 2019/0366926 A1 | 12/2019 | Hathaway et al. |

FOREIGN PATENT DOCUMENTS

| | | |
|---|---|---|
| JP | 2005-017283 A | 1/2005 |
| JP | 2007-139690 A | 6/2007 |
| JP | 2007-240369 A | 9/2007 |
| JP | 2008-203147 A | 9/2008 |
| JP | 2017-090138 A | 5/2017 |
| JP | 2018-162977 A | 10/2018 |
| JP | 2019-132643 A | 8/2019 |

*Primary Examiner* — William Kelleher
*Assistant Examiner* — Helena H Seraydaryan
(74) *Attorney, Agent, or Firm* — Oliff PLC

(57) ABSTRACT

A method for installing a radio wave sensor configured to radiate a radio wave to a range including a target area that is set for detection of an object. The method includes: a step of installing a reference object; and a step of adjusting a radio wave radiation direction of the radio wave sensor, using the reference object as a reference. The reference object is installed at a first position outside the target area.

12 Claims, 13 Drawing Sheets

METHOD FOR INSTALLING RADIO WAVE SENSOR, RADIO WAVE SENSOR, AND ADJUSTMENT DEVICE

TECHNICAL FIELD

The present disclosure relates to a method for installing a radio wave sensor, a radio wave sensor, and an adjustment device. This application claims priority on Japanese Patent Application No. 2019-223080 filed on Dec. 10, 2019, the entire content of which is incorporated herein by reference.

BACKGROUND ART

PATENT LITERATURE 1 discloses a radio wave sensor that radiates a radio wave to a target area that is set so as to include a pedestrian crossing, and that detects an object. PATENT LITERATURE 2 discloses measuring the direction of a reference object installed in a target area that is set so as to include a pedestrian crossing, thereby recognizing deviation of the orientation of a radio wave sensor.

CITATION LIST

Patent Literature

PATENT LITERATURE 1: Japanese Laid-Open Patent Publication No. 2017-90138
PATENT LITERATURE 2: Japanese Laid-Open Patent Publication No. 2018-162977

SUMMARY OF THE INVENTION

An aspect of the present disclosure is a method for installing a radio wave sensor. The method of the disclosure is for installing a radio wave sensor configured to radiate a radio wave to a range including a target area that is set for detection of an object. The method includes: a step of installing a reference object; and a step of adjusting a radio wave radiation direction of the radio wave sensor, using the reference object as a reference. The reference object is installed at a first position outside the target area.

Another aspect of the present disclosure is a radio wave sensor. The radio wave sensor of the disclosure is configured to radiate a radio wave to a range including a target area that is set for detection of an object. The radio wave sensor includes a sighting device having a sighting direction that has an angle with respect to a radio wave radiation direction of the radio wave sensor. The sighting direction is a direction extending from the radio wave sensor toward a position outside the target area, when the radio wave radiation direction is directed to the target area.

A radio wave sensor of the disclosure is configured to radiate a radio wave to an inside and an outside of a target area that is set for detection of an object. The radio wave sensor includes: a display configured to display a screen including a first image that indicates a radio wave reflection position of a reference object installed outside the target area and that is to be used for adjustment of a radio wave radiation direction of the radio wave sensor, and a second image indicating an adjustment direction; and a controller configured to execute an operation of setting the adjustment direction. The adjustment direction is a direction that has a first angle with respect to the radio wave radiation direction. The first angle is an angle identical to a second angle between a reference direction extending from the radio wave sensor toward the reference object and a target direction extending from the radio wave sensor toward a second position in the target area.

Another aspect of the present disclosure is an adjustment device. The adjustment device of the disclosure is for a radio wave radiation direction of a radio wave sensor configured to radiate a radio wave to an inside and an outside of a target area that is set for detection of an object. The adjustment device includes: a display configured to display a screen including a first image that indicates a radio wave reflection position of a reference object installed outside the target area and that is to be used for adjustment of the radio wave radiation direction, and a second image indicating an adjustment direction; and a controller configured to execute an operation of setting the adjustment direction. The adjustment direction is a direction that has a first angle with respect to the radio wave radiation direction. The first angle is an angle identical to a second angle between a reference direction extending from the radio wave sensor toward the reference object and a target direction extending from the radio wave sensor toward a second position in the target area.

DETAILED DESCRIPTION

Figure 1:
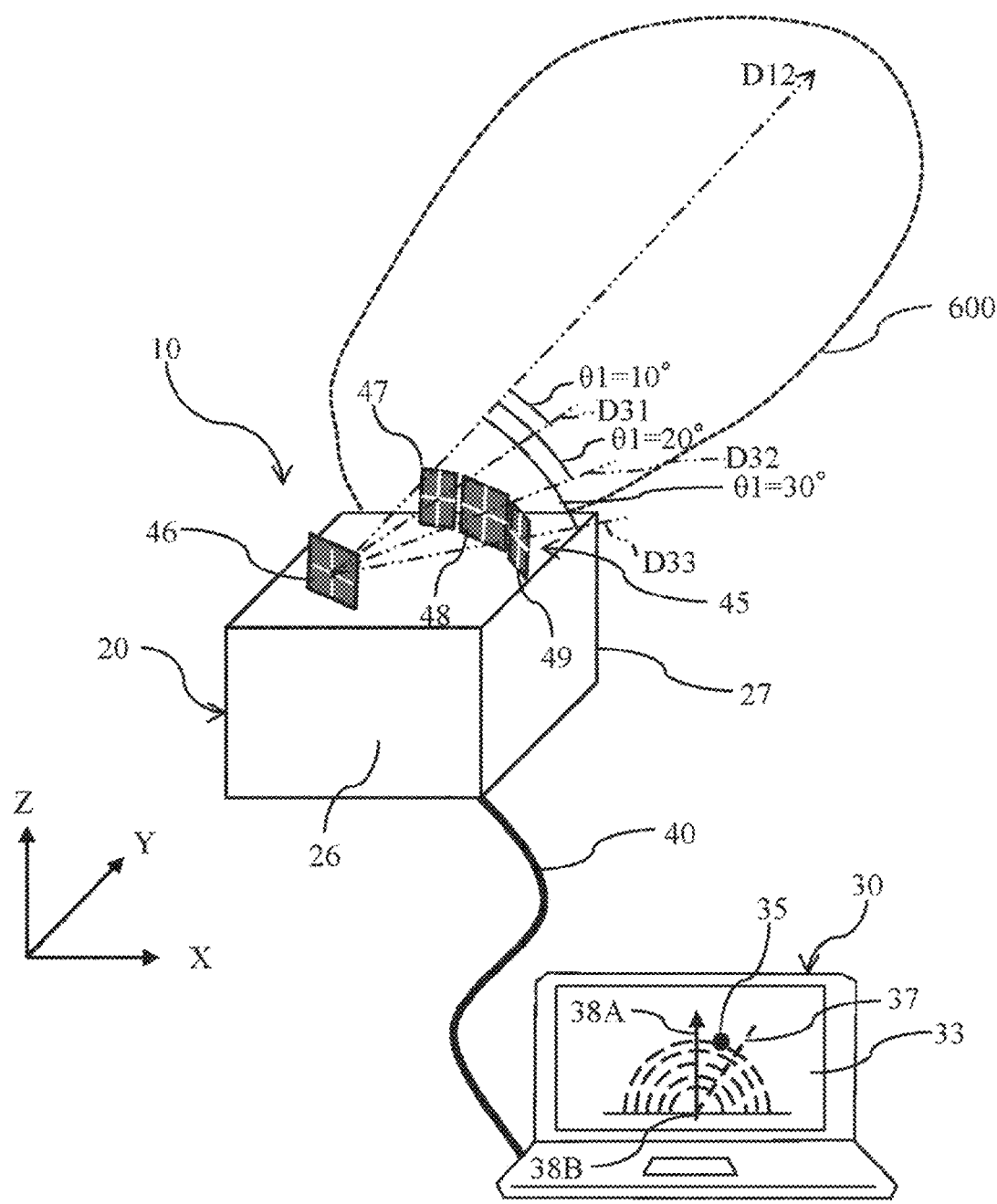
FIG. 1 is a perspective view of a radio wave sensor.

Description of Embodiment of the Present Disclosure

When the radio wave radiation direction of a radio wave sensor is inaccurate, the original ability of the radio wave sensor is impaired. For example, when the radio wave radiation direction of a radio wave sensor is inaccurate, decrease of reflection intensity of the radio wave is caused. When the radio wave radiation direction of a radio wave sensor is inaccurate, there is also a case where a part of the target area is positioned outside the detectable range of the radio wave sensor.

As described in PATENT LITERATURE 2, when a reference object is used, the radio wave radiation direction can be accurately directed to the target area. Therefore, use of a reference object is advantageous for adjustment of the radio wave radiation direction. However, there are cases where a reference object is difficult to be installed in the target area. For example, when a target area is to be set in a road for vehicle traveling, work of installing a reference object on the road is required. When a worker in charge of installing the reference object is to install the reference object on a road on which vehicles travel, it is necessary to close the road, and this causes difficulty in the work of installing the reference object.

Therefore, even in a case where a target area of a radio wave sensor is set in a place that is not easy for the worker to enter, it is desired that the radio wave radiation direction of the radio wave sensor can be easily adjusted.

(1) A method according to an embodiment is a method for installing a radio wave sensor configured to radiate a radio wave to a range including a target area that is set for detection of an object. The method for installing the radio wave sensor includes a step of installing a reference object; and a step of adjusting a radio wave radiation direction of the radio wave sensor, using the reference object as a reference. Here, the radio wave radiation direction denotes the direction in which a radio wave radiated with directivity advances. For example, when the face from which a radio wave is radiated in a radio wave sensor is defined as the front face of the radio wave sensor, the radio wave radiation direction corresponds to the front face direction of the radio wave sensor. The reference object is installed at a first position outside the target area. Since the reference object is installed outside the target area, there is no need for a worker to enter the target area in order to install the reference object. Therefore, even in a case where the target area is set in a place that is not easy for the worker to enter, installation of the reference object is easy. As a result, adjustment of the radio wave radiation direction of the radio wave sensor is facilitated.

(2) Preferably, a first distance from the radio wave sensor to the first position is a distance identical to a second distance from the radio wave sensor to a second position in the target area. In this case, the distance from the radio wave sensor to the reference object is substantially the same as the distance from the radio wave sensor to the target area, whereby the position of the reference object becomes appropriate. The second position may be any position in the target area. However, when a predetermined position (e.g., a base position described later) for determining the radio wave radiation direction of the radio wave sensor is present in the target area, the second position is preferably the predetermined position.

(3) Preferably, the step of adjusting the radio wave radiation direction includes adjusting an elevation angle of the radio wave sensor on the basis of a radio wave reflection power from the reference object. In this case, the elevation angle of the radio wave sensor is made appropriate. When the first distance and the second distance are set to be identical with each other, the radio wave reflection power from an object in the target area is increased by adjusting the elevation angle of the radio wave sensor on the basis of the radio wave reflection power from the reference object outside the target area.

(4) The step of adjusting the radio wave radiation direction can include aligning an adjustment direction having a first angle with respect to the radio wave radiation direction, with a reference direction extending from the radio wave sensor toward the reference object. Although depending on the directivity of the radio wave sensor, the radio wave radiation direction is, in general, the front face direction of the radio wave sensor. Preferably, the first angle is identical to a second angle between the reference direction and a target direction extending from the radio wave sensor toward the second position in the target area. In this case, when the adjustment direction is aligned with the reference direction, the radio wave radiation direction can be aligned with the target direction. Preferably, the first position is a position at which the radio wave sensor can detect the radio wave reflection position of the reference object when the adjustment direction is aligned with the reference direction.

(5) Preferably, the step of adjusting the radio wave radiation direction further includes displaying, on a screen, a radio wave reflection position of the reference object and the adjustment direction. In this case, with reference to the screen, whether or not the radio wave reflection position and the adjustment direction match each other can be confirmed.

(6) Preferably, the step of adjusting the radio wave radiation direction further includes outputting, performed by a device configured to calculate a difference between the adjustment direction and a direction of a radio wave reflection position of the reference object, information regarding the difference via a user interface. In this case, the difference can be easily understood. The output of the information regarding the difference may be a display on the screen, or may be a display of a lamp or an output of sound.

(7) The aligning of the adjustment direction with the reference direction can include aligning a sight of a sighting device provided to the radio wave sensor, with the reference object. Preferably, the adjustment direction is identical to a sighting direction of the sighting device. In this case, when the sighting direction is directed to the reference object, the adjustment direction can be aligned with the reference direction.

(8) The step of adjusting the radio wave radiation direction can include: aligning the radio wave radiation direction with the reference direction extending from the radio wave sensor toward the reference object; and rotating the radio wave radiation direction after having aligned the radio wave radiation direction with the reference direction, thereby aligning the radio wave radiation direction with the target direction extending from the radio wave sensor toward the second position. Preferably, a rotation angle when rotating the radio wave radiation direction has a magnitude that corresponds to an angle between the reference direction and the target direction. In this case as well, the radio wave radiation direction can be aligned with the target direction.

(9) Preferably, the target area is set in a range including a lane for vehicle traveling. Preferably, the reference object is installed outside the lane in which the target area is set. In this case, there is no need for a worker to enter the lane in which the target area is set, in order to install the reference object. The "outside the lane" may be "outside the road", or may be "in the road but in a range of a lane other than the lane in which the target area is set".

(10) Preferably, the target area is set in a range including a road for vehicle traveling. Preferably, the reference object is installed outside the road. In this case, there is no need for the worker to enter the road on which vehicles travel, in order to install the reference object.

(11) Preferably, the radio wave sensor is installed on one outer side out of both outer sides at left and right of the road. In this case, there is no need for the worker to enter the road in order to install the radio wave sensor. Preferably, the reference object is installed on the one outer side. In this case, since the reference object and the radio wave sensor are installed on the same side out of both outer sides at the left and right of the road, there is no need for the worker to cross the road.

(12) A radio wave sensor according to the embodiment is used in order to radiate a radio wave to a range including a target area that is set for detection of an object. Preferably, the radio wave sensor includes a sighting device having a sighting direction that has an angle with respect to a radio wave radiation direction of the radio wave sensor. Preferably, the sighting direction is a direction extending from the radio wave sensor toward a position outside the target area, when the radio wave radiation direction is directed to the target area. In this case, the sight of the sighting device can be aligned with the reference object installed outside the target area. The sighting device can have one or a plurality of sighting directions. When the sighting device has a plurality of sighting directions, it is sufficient that at least one sighting direction is a direction toward the outside of the target area.

(13) A radio wave sensor according to the embodiment is used in order to radiate a radio wave to an inside and an outside of a target area that is set for detection of an object. The radio wave sensor can include: a display configured to display a screen including a first image that indicates a radio wave reflection position of a reference object installed outside the target area and that is to be used for adjustment of a radio wave radiation direction of the radio wave sensor, and a second image indicating an adjustment direction; and a controller configured to execute an operation of setting the adjustment direction. Preferably, the adjustment direction is a direction that has a first angle with respect to the radio wave radiation direction. Preferably, the first angle is an angle identical to a second angle between a reference direction extending from the radio wave sensor toward the reference object and a target direction extending from the radio wave sensor toward a second position in the target area.

(14) Preferably, the controller is configured to calculate a difference between the adjustment direction and a direction of the radio wave reflection position and to output the difference.

(15) An adjustment device according to the embodiment is used for adjustment of a radio wave radiation direction of a radio wave sensor configured to radiate a radio wave to an inside and an outside of a target area that is set for detection of an object. The adjustment device can include: a display configured to display a screen including a first image that indicates a radio wave reflection position of a reference object installed outside the target area and that is to be used for adjustment of the radio wave radiation direction, and a second image indicating an adjustment direction; and a controller configured to execute an operation of setting the adjustment direction. Preferably, the adjustment direction is a direction that has a first angle with respect to the radio wave radiation direction. Preferably, the first angle is an angle identical to a second angle between a reference direction extending from the radio wave sensor toward the reference object and a target direction extending from the radio wave sensor toward a second position in the target area.

(16) Preferably, the controller is configured to calculate a difference between the adjustment direction and a direction of the radio wave reflection position, and to output the difference.

A computer program according to the embodiment includes commands for causing a computer to operate as the controller. The computer program is stored in a computer-readable non-transitory storage medium. The computer program is read and executed by a processor of the computer.

According to the present disclosure, adjustment of the radio wave radiation direction of the radio wave sensor is facilitated.

Details of Embodiment of the Present Disclosure

Figure 2:
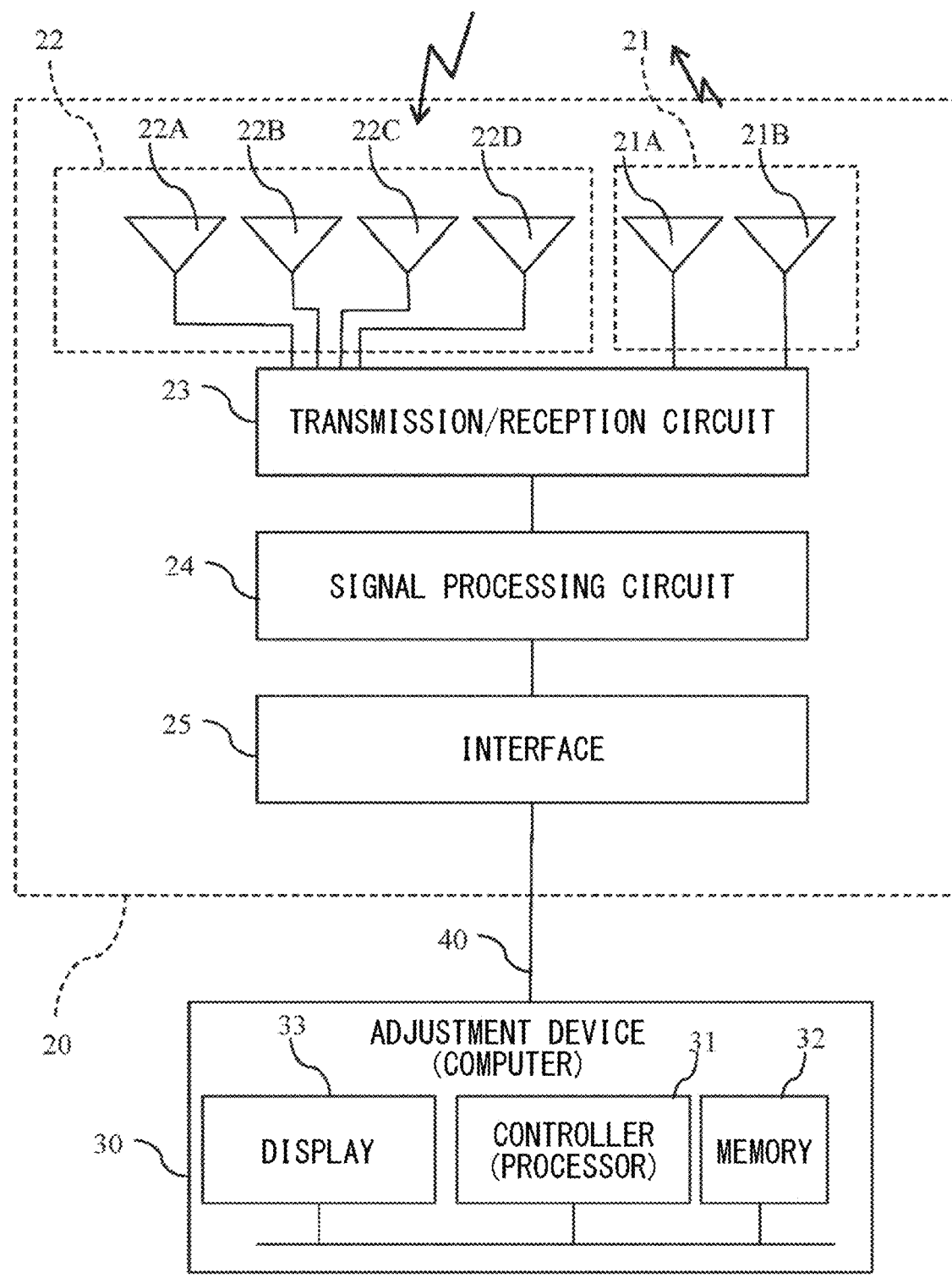
FIG. 2 is a hardware configuration diagram of the radio wave sensor.

FIG. 1 and FIG. 2 each show a radio wave sensor 10 according to an embodiment. The radio wave sensor 10 radiates a radio wave, and receives a reflected wave from an object, thereby detecting the object. The radio wave sensor 10 of the embodiment is a millimeter-wave radar. The radio wave sensor 10 of the embodiment is used in order to detect a vehicle traveling on a road. The detection result of the vehicle is used for traffic flow measurement or vehicle traveling support, for example.

The radio wave sensor 10 includes a radio wave sensor body 20 covered by a housing 26. In the housing 26, a transmission antenna 21, a reception antenna 22, a transmission/reception circuit 23, a signal processing circuit 24, and an interface 25 are provided.

The housing 26 has a front face 27 at which transmission/reception of a radio wave 600 is performed. In FIG. 1, the front face 27 is present on the farther side of the housing 26. The transmission antenna 21 is disposed inside the housing 26 so as to radiate the radio wave 600 in a direction (forward of the radio wave sensor 10) D12 orthogonal to the front face 27 of the housing 26. Therefore, in the embodiment, the front face direction D12 of the housing 26 is the radio wave radiation direction. The reception antenna 22 is disposed inside the housing 26 so as to receive a reflected wave at the front face 27.

The transmission antenna 21 includes a plurality of antenna elements 21A, 21B. In FIG. 2, the number of antenna elements 21A, 21B forming the transmission antenna 21 is two, for example. The plurality of antenna elements 21A, 21B are arranged in the horizontal direction.

A radio wave radiated from the transmission antenna 21 is reflected at an object. The reception antenna 22 receives a reflected wave from the object. The reception antenna 22 includes a plurality of antenna elements 22A, 22B, 22C, 22D. In FIG. 2, the number of antenna elements 22A, 22B, 22C, 22D forming the reception antenna 22 is four, for example. The plurality of antenna elements 22A, 22B, 22C, 22D are arranged in the horizontal direction.

The transmission antenna 21 and the reception antenna 22 are connected to the transmission/reception circuit 23. The transmission/reception circuit 23 outputs, to the transmission antenna 21, a signal that is radiated as a radio wave. The signal radiated as a radio wave is a frequency modulated continuous wave (FMCW), for example. The transmission/reception circuit 23 outputs, to the signal processing circuit 24, a signal of the reflected wave received by the reception antenna 22.

The signal processing circuit 24 detects the distance to, and the direction, the speed, and the like of the object, from the reflected-wave signal. The detection result including the distance to, and the direction, the speed, and the like of the object can be outputted to the outside of the radio wave sensor body 20 via the interface 25. The interface 25 is used for providing connection with an external device such as an adjustment device 30 described later.

The radio wave sensor 10 according to the embodiment further includes the adjustment device 30. The adjustment device 30 is used by being connected to the interface 25 of the radio wave sensor body 20, when the radio wave sensor body 20 is to be installed. The adjustment device 30 is used in order to adjust the radio wave radiation direction by adjusting the orientation of the radio wave sensor body 20. In order to adjust the orientation of the radio wave sensor body 20, the adjustment device 30 receives the detection result of the object from the radio wave sensor body 20. It should be noted that, after the radio wave sensor body 20 has been installed, the adjustment device 30 is disconnected from the radio wave sensor body 20. The connection between the radio wave sensor body 20 and the adjustment device 30 may be wired connection using a cable 40, or may be wireless connection.

The adjustment device 30 is implemented by a computer that includes a processor 31 and a memory 32 connected to the processor 31. The processor 31 operates as a controller regarding orientation adjustment of the radio wave sensor body 20. The memory 32 has stored therein a computer program that includes commands for causing the processor 31 to execute an operation for orientation adjustment of the radio wave sensor body 20. The processor 31 reads out the computer program from the memory 32 and executes the computer program, thereby operating as the controller regarding the orientation adjustment of the radio wave sensor body 20. The operation of the controller includes an operation of setting an adjustment direction D11 (described later).

The adjustment device 30 includes a display 33. The display 33 displays a screen to be used for adjustment of the orientation of the radio wave sensor body 20. The display content of the display 33 is controlled by the processor 31 functioning as the controller.

The radio wave sensor body 20 includes a sighting device 45 to be used for adjustment of the orientation of the radio wave sensor body 20. The sighting device 45 is used in order to visually align the orientation of the radio wave sensor body 20 with a predetermined sighting direction D31, D32, D33. The sighting device 45 shown in FIG. 1 includes a single rear sight 46, and front sights 47, 48, 49. The sighting device 45 shown in FIG. 1 includes the plurality of front sights 47, 48, 49 in order to obtain the plurality of sighting directions D31, D32, D33. The plurality of front sights 47, 48, 49 include a first front sight 47, a second front sight 48, and a third front sight 49.

When the rear sight 46 and the first front sight 47 are used, the sight can be visually set on the first sighting direction D31. When the rear sight 46 and the second front sight 48 are used, the sight can be set on the second sighting direction D32. When the rear sight 46 and the third front sight 49 are used, the sight can be set on the third sighting direction D33.

The plurality of sighting directions D31, D32, D33 are directions that are respectively different in, for example, a horizontal plane, and each have an angle with respect to the front face direction (radio wave radiation direction) D12 of the radio wave sensor body 20. Here, the horizontal plane is the XY plane shown in FIG. 1. The Z direction in FIG. 1 is the vertical direction. In FIG. 1, the angle (first angle θ1) of the first sighting direction D31 with respect to the front face direction (radio wave radiation direction) D12 is 10°. The angle (first angle θ1) of the second sighting direction D32 with respect to the front face direction (radio wave radiation direction) D12 is 20°. The angle (first angle θ1) of the third sighting direction D33 with respect to the front face direction (radio wave radiation direction) D12 is 30°. Here, the first angle θ1 is an angle in the horizontal plane. All or at least one of the plurality of sighting directions D31, D32, D33 is a direction toward a reference object 200 described later that is installed outside a target area 100 for object detection, when the front face direction (radio wave radiation direction) D12 of the radio wave sensor 10 is directed to the target area 100. More specifically, all or at least one of the plurality of sighting directions D31, D32, D33 is a direction toward the reference object 200 installed outside the target area 100, when the front face direction (radio wave radiation direction) D12 of the radio wave sensor 10 is directed to a position P2 described later. It should be noted that specific directions of the sighting directions D31, D32, D33 are not limited in particular.

In order to obtain a plurality of sighting directions, a plurality of rear sights and a single front sight may be used. In order to obtain a plurality of sighting directions, a mechanism that changes a sighting direction formed by a single rear sight and a single front sight may be used. As the mechanism that changes the sighting direction, a function that rotates a set of a rear sight and a front sight with respect to the housing 26 is adopted, for example.

Figure 3:
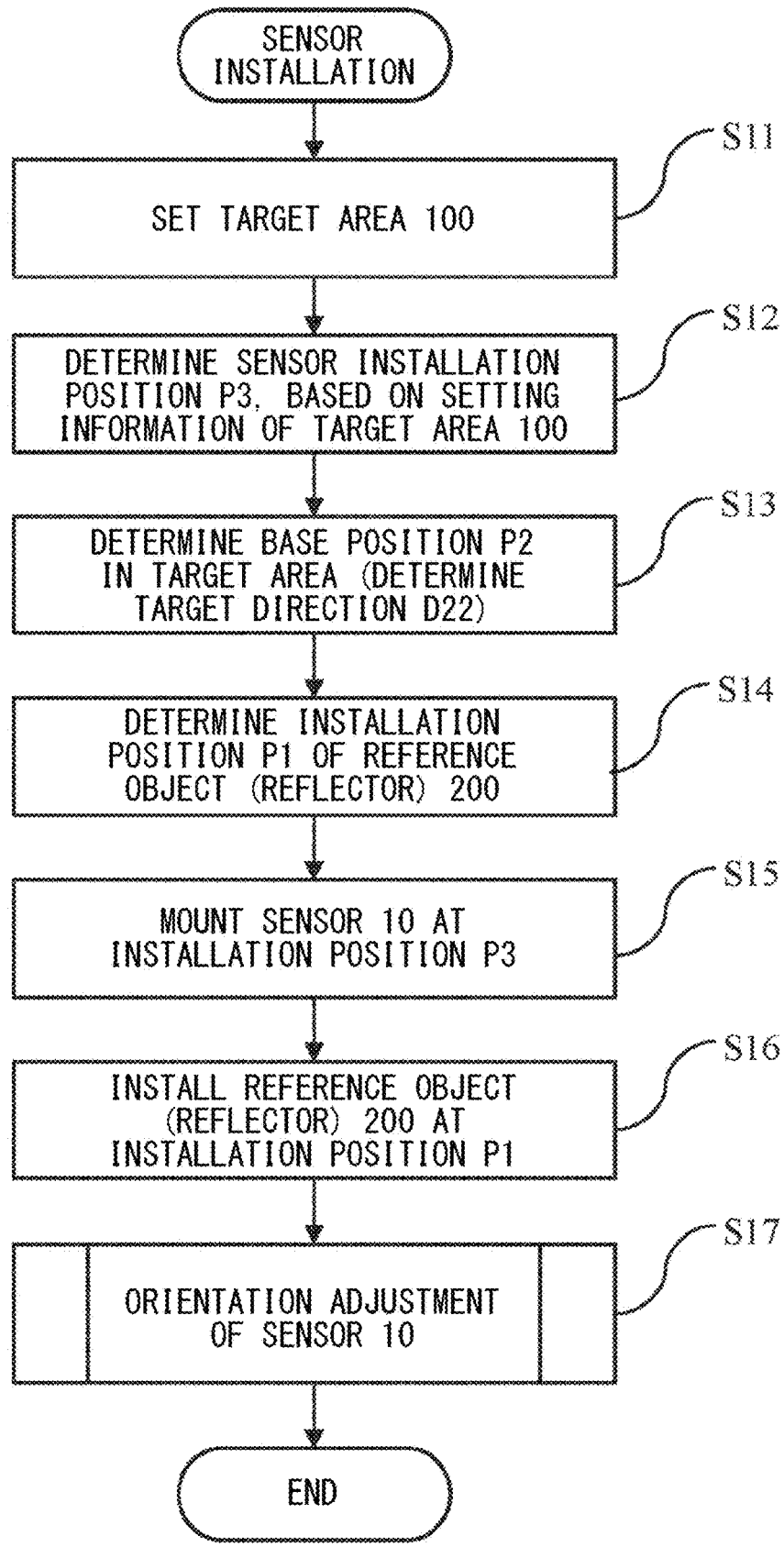
FIG. 3 is a flow chart showing a sensor installation procedure.

FIG. 3 shows an installation procedure of the radio wave sensor 10 (the radio wave sensor body 20). First, in step S11, a target area 100 is set. The target area 100 is set on a road 300 on which a vehicle as a detection target object travels, for example (see FIG. 4). The place and range in which the target area 100 is to be set are described in a specification document regarding installation of the radio wave sensor 10, for example.

When the target area 100 is to be set, the adjustment device 30 causes the display 33 to display a map of a region including the road 300 where the target area 100 is to be set. An operator of the adjustment device 30 performs, on the adjustment device 30, an operation of specifying the target area 100 on the map. The adjustment device 30 receives the operation of specifying the target area 100, and stores data regarding the target area 100 into the memory 32.

Figure 4:
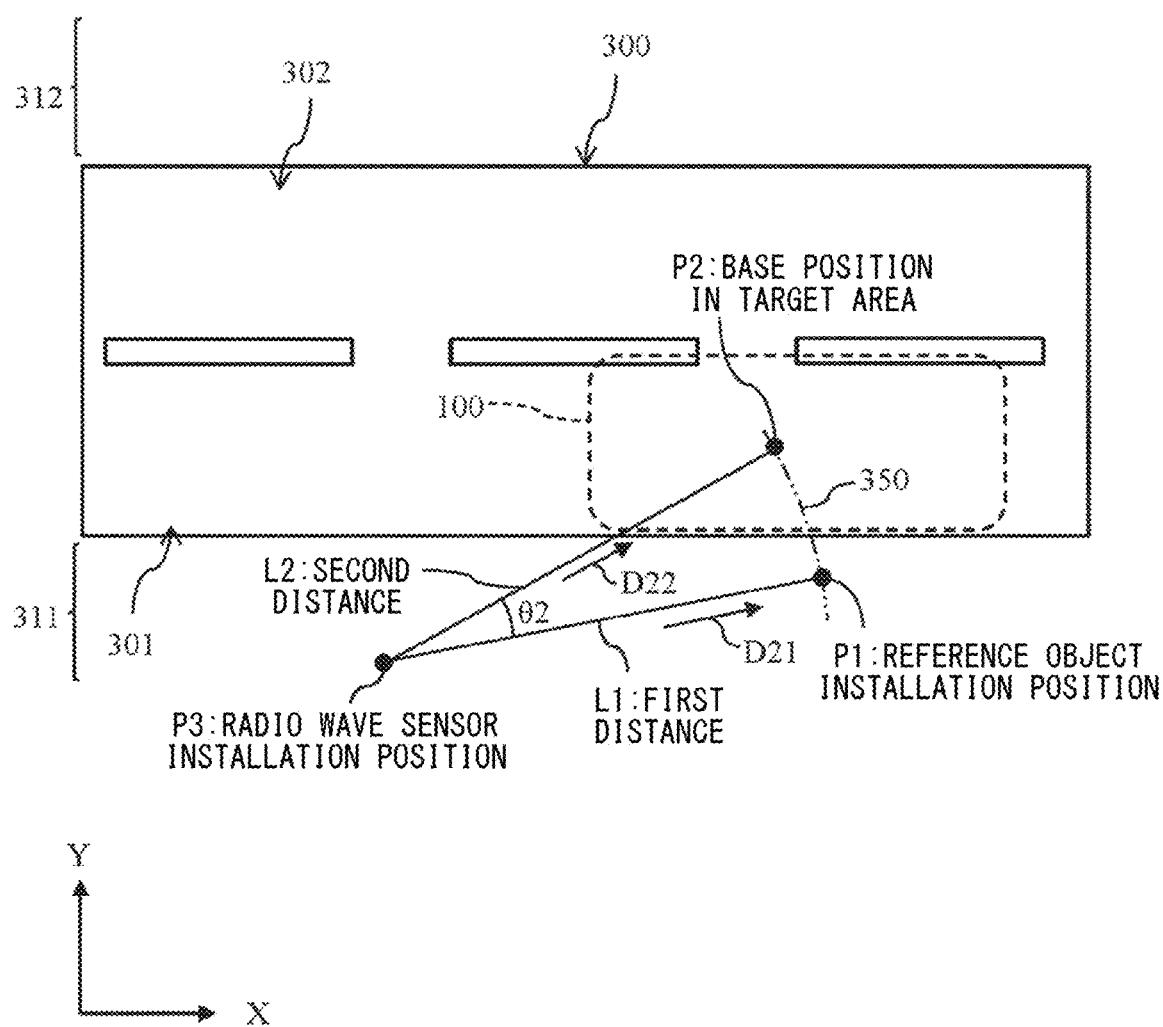
FIG. 4 illustrates a target area, a reference object installation position, a base position in the target area, and a radio wave sensor installation position.

In the embodiment, the target area 100 is set in a range including the road 300 for vehicle traveling. The road 300 is a highway, for example. The road 300 includes one or a plurality of lanes 301, 302 for vehicle traveling. The target area 100 may be set in a range including all of the plurality of lanes 301, 302, or may be set only in a range including the lane 301 being a part of the plurality of lanes 301, 302. In FIG. 4, the target area 100 is set in a range including one lane 301 only, out of the two lanes 301, 302.

In step S12, an installation position P3 of the radio wave sensor 10 is determined (see FIG. 4). The installation position P3 is set in the vicinity of the target area 100 such that an object in the target area 100 can be detected by the radio wave sensor 10.

The operator of the adjustment device 30 refers to the aforementioned map on which the target area 100 has been set, and performs, on the adjustment device 30, an operation of specifying the installation position P3 of the radio wave sensor 10. The adjustment device 30 receives the operation of specifying the installation position P3, and stores data regarding the installation position P3 into the memory 32.

In the embodiment, the installation position P3 is set on an outer side 311, 312 of the road 300. More specifically, the radio wave sensor 10 is installed on the outer side 311, which is one of both outer sides 311, 312 at the left and right of the road 300. Since the installation position P3 of the radio wave sensor 10 is set on the outer side 311, 312 of the road 300, there is no need for a worker to enter the road 300 for installation work of the radio wave sensor 10. In addition, there is no need to close the road 300 for the installation work of the radio wave sensor 10.

In step S13, a base position P2 in the target area 100 is determined (see FIG. 4). The base position P2 is determined as an appropriate position in the target area 100. The base position P2 is a position to which the radio wave radiation direction (front face direction) D12 of the radio wave sensor 10 is to be directed. The base position P2 is set such that the entirety of the target area 100 is within the detectable range of the radio wave sensor 10, for example. The base position P2 is determined as a position at which the reflection power from the target area 100 becomes high as a whole of the target area 100, on the basis of the directivity of the radio wave sensor 10 and the installation position P3, for example. The base position P2 may be calculated by the adjustment device 30 on the basis of the directivity of the radio wave sensor 10 and the installation position P3, or may be determined and inputted by the operator to the adjustment device 30. The adjustment device 30 stores data regarding the base position P2 into the memory 32.

When the base position P2 has been determined, a direction extending from the installation position P3 toward the base position P2 is naturally determined as a target direction (base direction) D22. The adjustment device 30 stores data regarding the target direction D22 into the memory 32. The target direction D22 is the direction in which the radio wave radiation direction (front face direction) D12 of the radio wave sensor 10 is to be directed.

In step S14, an installation position P1 of the reference object 200 is determined (see FIG. 4). The reference object 200 is an object to serve as a reference for determining the orientation of the radio wave sensor 10. The reference object 200 functions as a reflector that reflects the radio wave radiated from the radio wave sensor 10, at the time of orientation adjustment of the radio wave sensor 10. The reference object 200 functions as a target on which the sight is set by the sighting device 45, at the time of orientation adjustment of the radio wave sensor 10.

In the embodiment, the installation position P1 of the reference object 200 is set outside the target area 100. In FIG. 4, the installation position P1 of the reference object 200 is set outside the target area 100 and outside the road 300. Since the installation position P1 of the reference object 200 is set outside the road 300 for vehicle traveling, there is no need for an installation worker of the reference object 200 to enter the road 300. In addition, there is no need to close the road 300 for the installation work of the reference object 200.

In FIG. 4, the installation position P1 of the reference object 200 is set on the same side 311 as the installation position P3 of the radio wave sensor 10, out of both outer sides 311, 312 at the left and right of the road 300. Since the installation position P1 of the reference object 200 and the installation position P3 of the radio wave sensor 10 are set on the same side 311 out of both outer sides 311, 312 at the left and right of the road 300, the worker can perform installation work of the reference object 200 and the radio wave sensor 10 only on the single side 311 of the road 300. Therefore, there is no need for the worker to cross the road 300.

It should be noted that it is possible to install the radio wave sensor 10 on one outer side 311 of the road 300, and to install the reference object 200 on the other outer side 312 of the road 300. However, in this case, the worker needs to cross the road 300 in order to install the reference object 200 and the radio wave sensor 10.

The installation position P1 of the reference object 200 may be inside the road 300 as long as the installation position P1 is outside the target area 100. For example, the installation position P1 of the reference object 200 may be set on the lane 302 being outside the lane 301 where the target area 100 is set. In this case, if only the lane 302 is closed without closing the lane 301 where the target area 100 is set, the reference object 200 can be installed.

Preferably, the installation position (first position) P1 of the reference object 200 is set at a distance identical to the distance from the installation position P3 of the radio wave sensor 10 to the base position (second position) P2 in the target area 100. That is, preferably, a distance L1 from the position P3 to the position P1 is identical to a distance L2 from the position P3 to the position P2. When the distance L1 and the distance L2 are an identical distance, the elevation angle of the radio wave sensor 10 can be appropriately adjusted. This will be described later.

The operator of the adjustment device 30 refers to the aforementioned map on which the target area 100, the base position P2 in the target area, and the radio wave sensor installation position P3 have been set, and performs, on the adjustment device 30, an operation of specifying the installation position P1 of the reference object 200. The adjustment device 30 receives the operation of specifying the installation position P1, and stores data regarding the installation position P1 into the memory 32. The data regarding the installation position P1 includes data indicating the distance L1.

The adjustment device 30 displays, on the display 33, one or a plurality of candidates for the installation position P1 of the reference object 200. Each candidate for the installation position P1 is displayed on the aforementioned map, for example. The candidate for the installation position P1 may be indicated by a dot or by a line. The dot indicating the candidate for the installation position P1 is indicated as one or a plurality of dots having a predetermined angle (e.g., 10°, 20°, or 30°) with respect to the direction D22 from P3 toward P2, on an arc 350 having a radius L2 about the position P3, for example. A line indicating the candidate for the installation position P1 is expressed as a circle or the arc 350 about the position P3 and having the radius L2, for example.

The operator of the adjustment device 30 refers to the one or plurality of candidates for the installation position P1 that have been displayed on the map, and can determine the installation position P1 of the reference object 200 in consideration of geographical features and the like.

When the installation position P1 has been determined, a direction extending from the installation position P3 toward the installation position P1 is determined as a reference direction (quasi-base direction) D21. The reference direction D21 is a direction that has a predetermined angle (second angle) θ2 with respect to the target direction D22. Here, the second angle θ2 is an angle in the horizontal plane. On the basis of the operation of specifying the installation position P1 performed by the operator, the adjustment device 30 obtains the reference direction D21 and the second angle θ2, and stores data regarding the reference direction D21 and the second angle θ2 into the memory 32.

Figure 5:
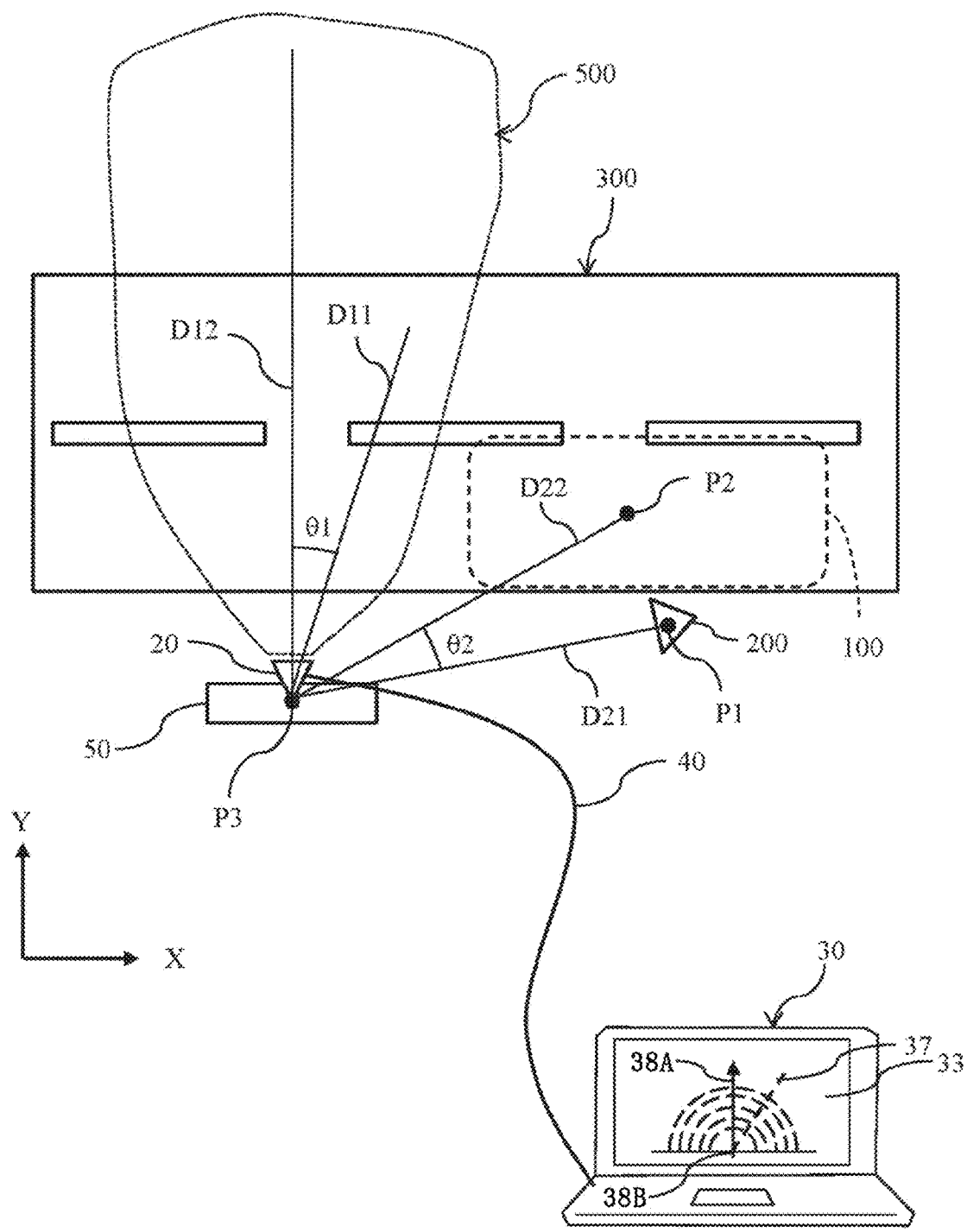
FIG. 5 shows a state in which a radio wave sensor before the orientation thereof is adjusted is mounted at the radio wave sensor installation position.

In step S15, the worker mounts the radio wave sensor 10 to a support 50 or the like provided at the installation position P3 (see FIG. 5). At this time point, the front face direction D12 of the radio wave sensor 10 need not be directed to the target area 100. As shown in FIG. 5, the radio wave sensor 10 has a detectable range 500. The detectable range 500 is a range in which an object can be detected by the radio wave sensor 10. In step S16, the worker installs the reference object 200 at the installation position P1 (see FIG. 5). The operator of the adjustment device 30, and the installation worker of the radio wave sensor 10 and the reference object 200 may be different persons, or may be the same person.

Figure 6:
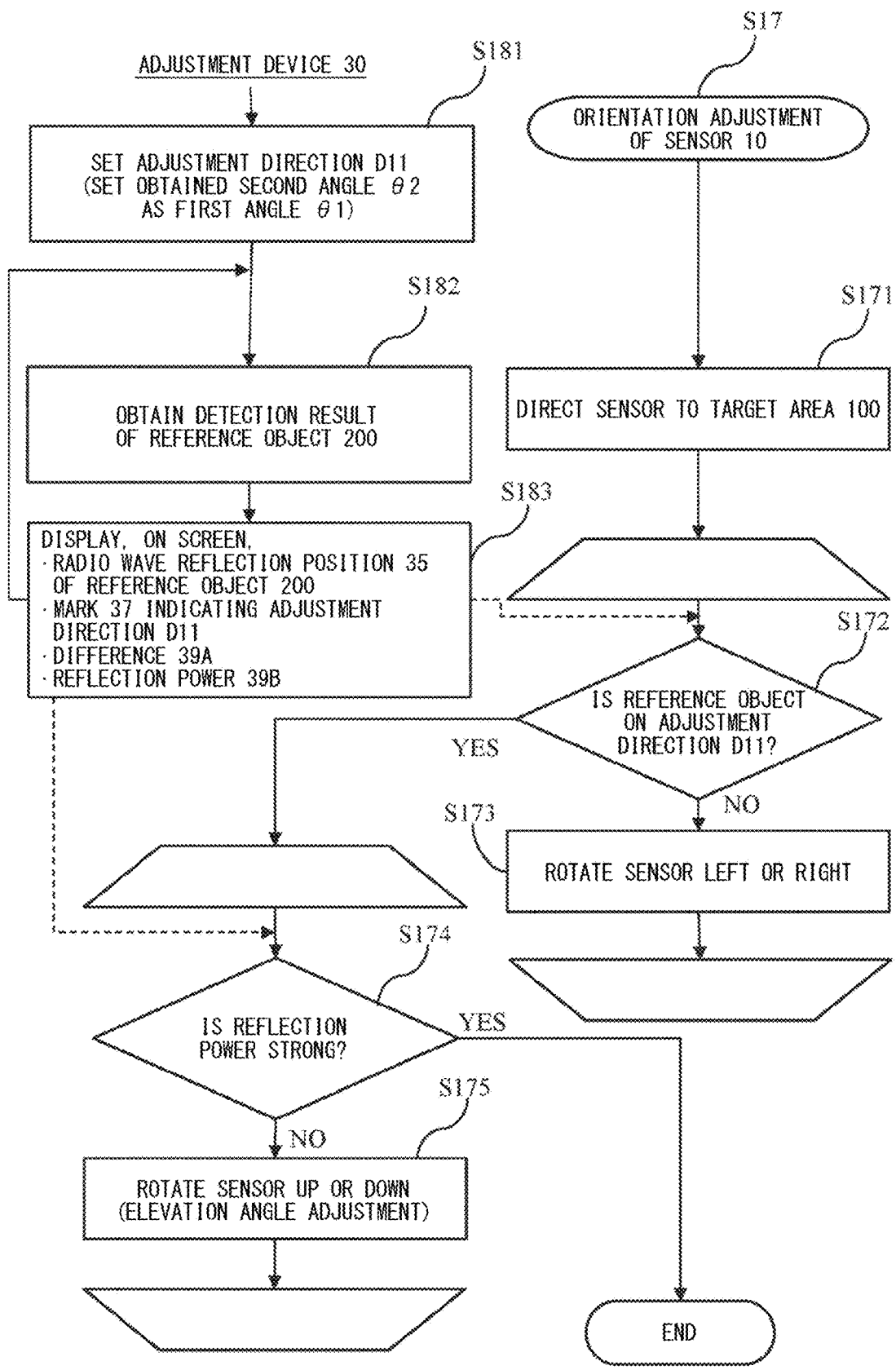
FIG. 6 is a flow chart showing an orientation adjustment procedure of the radio wave sensor.

In the subsequent step S17, work of adjusting the orientation of the radio wave sensor 10 is performed, using the reference object 200 as a reference. FIG. 6 shows details of step S17. In the adjustment work shown in FIG. 6, the sighting device 45 is not used. Adjustment work that uses the sighting device 45 will be described with reference to FIG. 9.

In the adjustment work shown in FIG. 6, the orientation of the radio wave sensor 10 is adjusted by using the adjustment device 30 connected to the radio wave sensor body 20. In step S181 in FIG. 6, the adjustment device 30 sets the adjustment direction D11 (see FIG. 5). The adjustment direction D11 is a direction that has an angle (first angle) θ1 with respect to the radio wave radiation direction D12 of the radio wave sensor 10. The first angle θ1 is set to be an angle identical to the second angle θ2. The adjustment device 30 determines the adjustment direction D11 on the basis of the radio wave radiation direction D12 set in advance in the adjustment device 30 and the previously-obtained second angle θ2, and stores data regarding the adjustment direction D11 into the memory 32.

Figure 7:
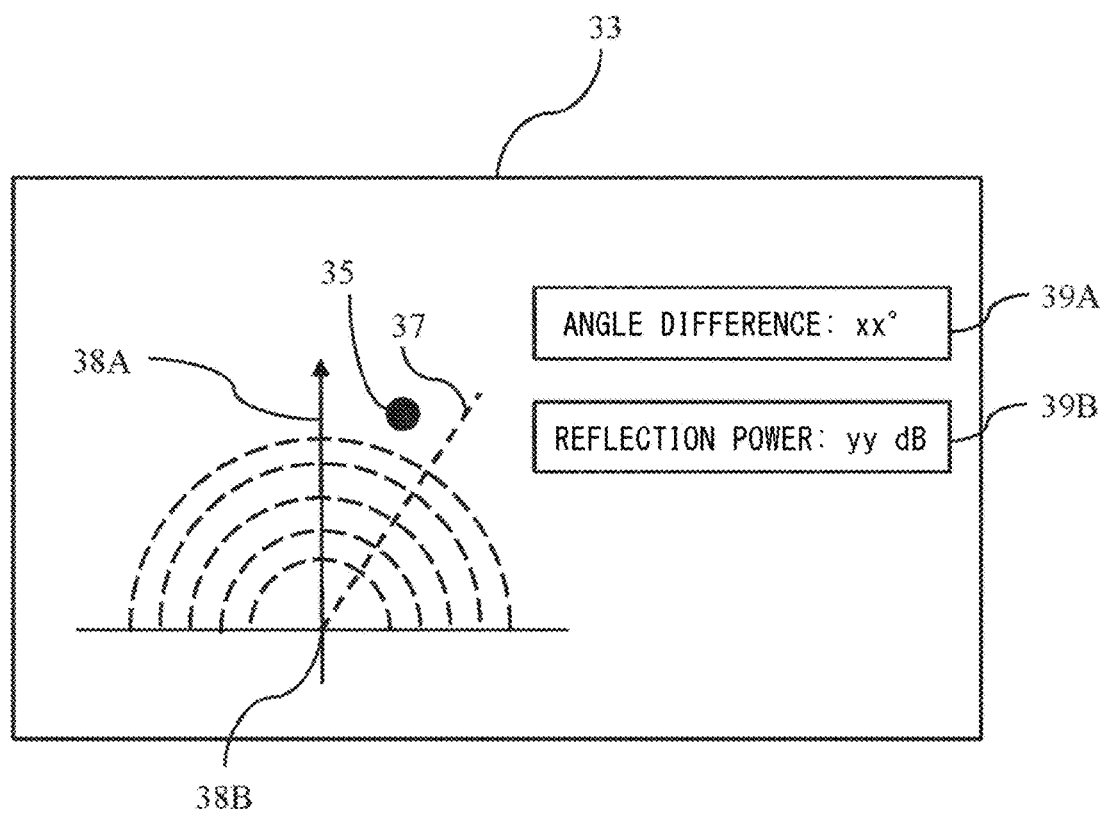
FIG. 7 shows a screen displayed on a display of an adjustment device.

The radio wave sensor body 20 installed at the installation position P3 is set to be in a state of being capable of detecting an object by transmitting/receiving a radio wave. The detection result is obtained by the adjustment device 30 connected to the radio wave sensor body 20 (step S182), and is displayed on the display 33 (step S183). As shown in FIG. 7, the adjustment device 30 outputs, on the display 33, a mark (first image) 35 indicating a radio wave reflection position of the reference object 200, a mark (second image) 37 indicating the adjustment direction D11 having the first angle θ1 with respect to the radio wave radiation direction, a mark (third image) 38A indicating the radio wave radiation direction (front face direction) D12, and a mark (fourth image) 38B indicating the radio wave sensor installation position P3. Since the reflection power from the reference object 200 is large, the adjustment device 30 can detect a position where a reflection power larger than a threshold can be obtained, as the radio wave reflection position of the reference object 200. Alternatively, the adjustment device 30 may detect a position where a reflection power can be obtained in a range in which the distance from the radio wave sensor 10 is L1, as the radio wave reflection position of the reference object 200. Since the reference object 200 is stationary, the adjustment device 30 may detect, as the radio wave reflection position, a position where a stationary object is present and where a reflection power can be obtained in a range in which the distance from the radio wave sensor 10 is L1.

On the display 33, a display 39A indicating the difference (angle difference) between the adjustment direction D11 and the direction of the radio wave reflection position of the reference object 200 is also outputted. Further, on the display 33, a display 39B indicating the reflection power from the reference object 200 is also outputted. The user interface for outputting information regarding the difference is not limited to a graphical user interface such as the display 33 that displays a screen, and may be an audio interface that outputs sound. The sound may be sound of a text indicating the difference, or may be sound that occurs periodically. Variation in the interval of the sound that periodically occurs can indicate the difference. The user interface that outputs sound may output sound having a magnitude that corresponds to the reflection power intensity. The user interface may be configured to indicate the difference in terms of variation in the flashing cycle of a lamp. The lamp may be configured to indicate the reflection power intensity in terms of light intensity. In this manner, the user interface outputs information regarding the difference, thereby facilitating understanding of the difference by the user.

The user interface may output at least one of sound and light only when the difference has become zero or in a predetermined range near zero. The sound or light may be outputted in combination with output performed by the display 33. For example, when output of difference in terms of sound or light is not sufficient, output by the display 33 may be used in combination.

In FIG. 7, the mark 37 indicating the adjustment direction D11 is depicted as a line extending along the adjustment direction D11, but may be depicted as a dot that is present on the adjustment direction D11. The mark 37 indicating the adjustment direction D11 may be depicted as a region that is spread around a dot or a line indicating the adjustment direction.

In step S171 in FIG. 6, the adjustment worker of the radio wave sensor 10 directs the orientation of the radio wave sensor 10 roughly to the target area 100. Accordingly, the detectable range 500 is rotated, and the reference object 200 enters the detectable range 500. As a result, the mark 35 indicating the radio wave reflection position of the reference object 200 is displayed on the display 33 (see FIG. 7). In FIG. 7, the direction of the mark 35 indicating the radio wave reflection position and the mark 37 indicating the adjustment direction D11 are deviated from each other, and it is seen that there is a difference therebetween (NO in step S172). This difference is shown in terms of a numerical value in the display 39A indicating the angle difference.

The adjustment worker rotates the radio wave sensor 10 in the left or right direction such that the mark 35 indicating the radio wave reflection position of the reference object 200 matches the position of the mark 37 indicating the adjustment direction D11, thereby adjusting the orientation in the horizontal direction (step S173). The adjustment direction D11 displayed on the display 33 is tilted by almost the first angle θ1, being an angle identical to the second angle θ2, with respect to the radio wave radiation direction D12. Therefore, when the radio wave reflection position (the reference direction D21) of the reference object 200 is aligned with the adjustment direction D11, the radio wave radiation direction D12 can be aligned with the target direction D22.

Figure 8:
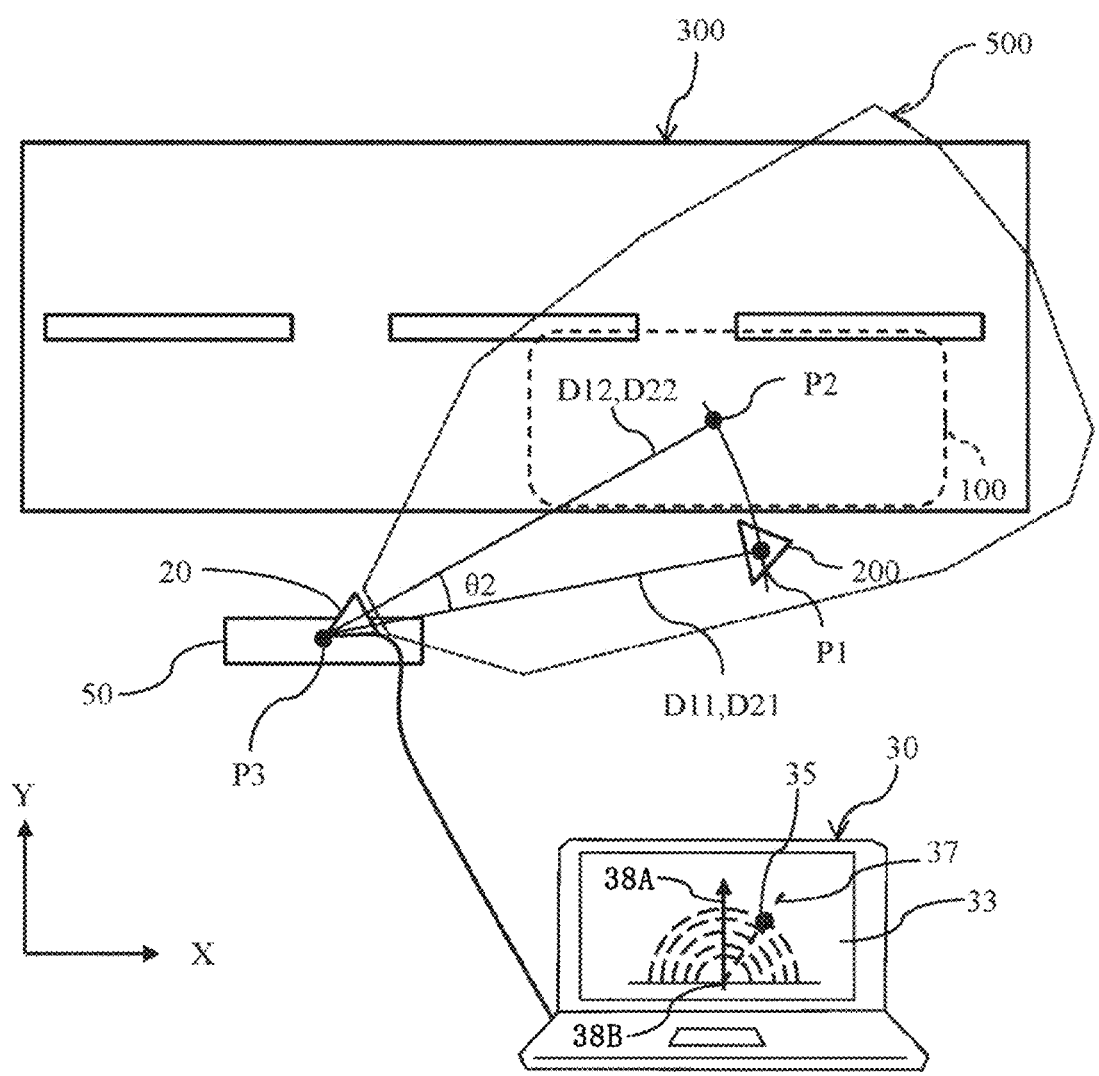
FIG. 8 shows the radio wave sensor of which the orientation has been adjusted.

As shown in FIG. 8, when the mark 35 indicating the radio wave reflection position (the reference direction D21) of the reference object 200 has matched the position of the mark 37 indicating the adjustment direction D11 (YES in step S172), adjustment of the orientation in the horizontal direction is completed.

Subsequently, the elevation angle of the radio wave sensor 10 is adjusted (steps S174, S175). Elevation angle adjustment of the radio wave sensor 10 is performed by the adjustment worker adjusting, with reference to the display 39B indicating the reflection power, the elevation angle to an elevation angle at which the reflection power from the reference object 200 becomes highest. The vertical plane directivity of the radio wave sensor 10 is different between the radio wave radiation direction D12 and the adjustment direction D11. However, the elevation angle at which the reflection power becomes largest is common between the radio wave radiation direction D12 and the adjustment direction D11. Therefore, when the elevation angle is adjusted to an elevation angle at which the reflection power from the reference object 200 present in the adjustment direction D11 becomes largest, the reflection power from an object in the radio wave radiation direction D12 (the base position P2) becomes largest.

According to the method for installing the radio wave sensor 10 shown in FIG. 3 to FIG. 8, the installation work of the radio wave sensor including installation of the reference object 200 can be performed only on the outer side 311, which is one side, of the road 300. Therefore, there is no need to enter the road 300 or close the road 300.

Figure 9:
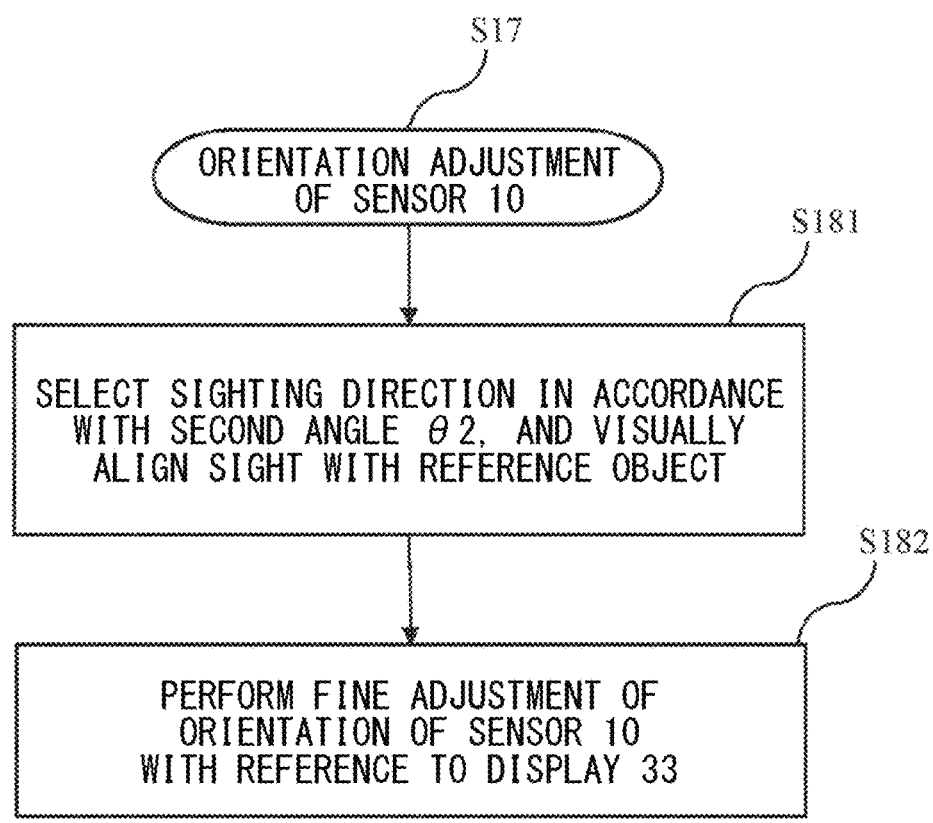
FIG. 9 is a flow chart showing another example of the orientation adjustment procedure of the radio wave sensor.

FIG. 9 shows a procedure of adjustment work that uses the adjustment device 30 and the sighting device 45 provided to the radio wave sensor body 20. In step S181 in FIG. 9, the orientation of the radio wave sensor 10 is visually adjusted by the worker by using the sighting device 45. The sighting device 45 shown in FIG. 1 has three sighting directions D31, D32, D33. In orientation adjustment of the radio wave sensor 10, a sighting direction D31, D32, D33 that corresponds to the second angle θ2 is selected. For example, when the second angle θ2 is 10°, the first sighting direction D31 having an angle (first angle θ1) of 10° with respect to the radio wave radiation direction D12 is selected. In this case, the first sighting direction D31 is the adjustment direction D11.

Then, the worker adjusts the orientation of the radio wave sensor body 20 such that the first sighting direction D31 being the adjustment direction D11 is aligned with the direction (reference direction) D21 of the reference object 200 installed at the installation position P1. Accordingly, the radio wave radiation direction D12 can be aligned with the target direction D22.

Then, adjustment of the orientation of the radio wave sensor 10 may be completed. However, for fine adjustment of the orientation, step S182 may be subsequently performed. In step S182, work from step S171 to step S175 shown in FIG. 6 is performed by using the adjustment device 30. When the adjustment using the adjustment device 30 is performed after the adjustment using the sighting device 45 has been performed, accuracy of the orientation can be easily enhanced. That is, when the sighting device 45 is used, orientation adjustment that is generally accurate can be easily performed, and the error remaining in the orientation can be eliminated by using the adjustment device 30.

Figure 10:
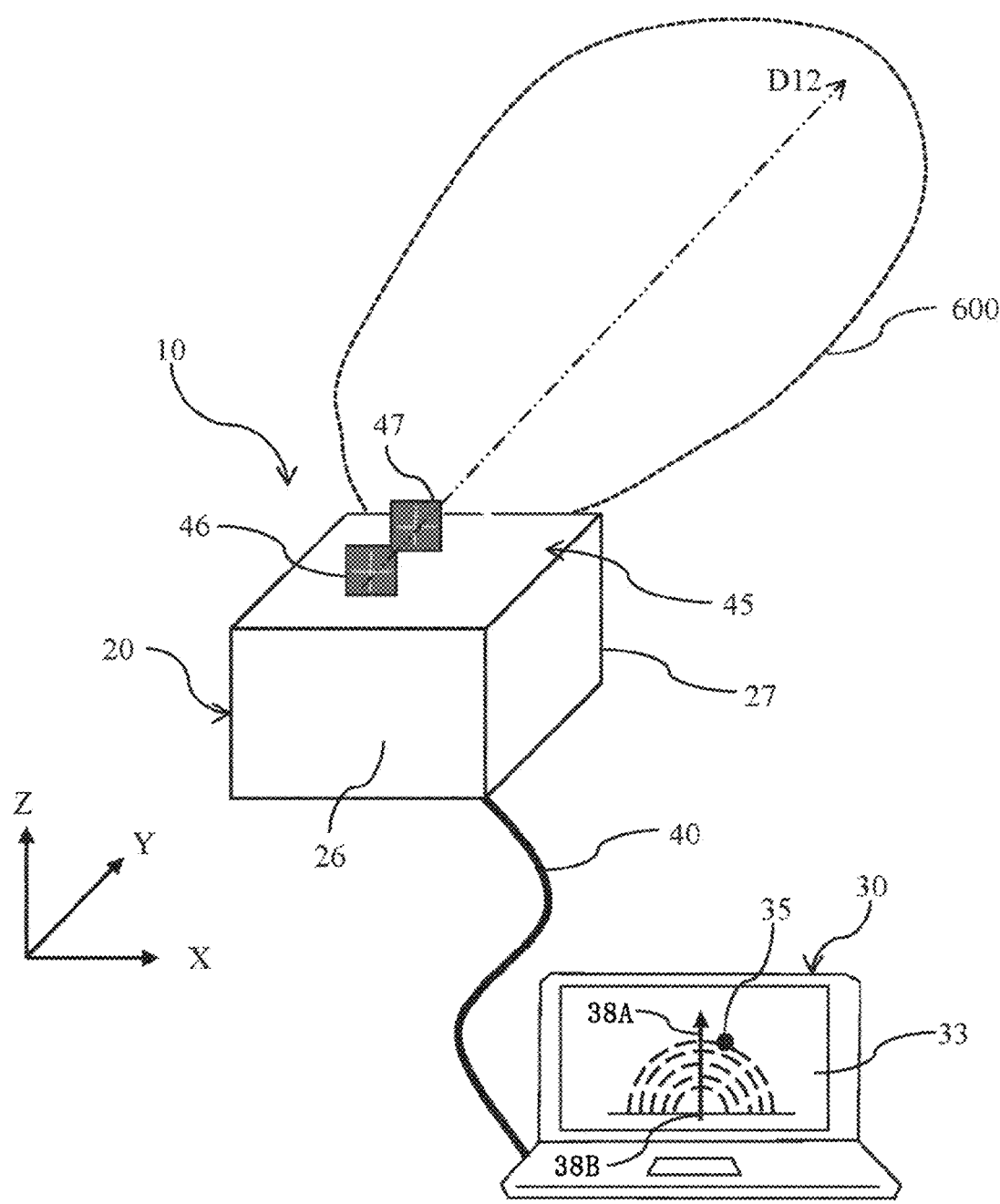
FIG. 10 is a perspective view showing another example of the radio wave sensor.

FIG. 10 to FIG. 13 show another example of the adjustment procedure of the orientation of the radio wave sensor 10. In the adjustment procedure shown in FIG. 10 to FIG. 13, the radio wave radiation direction (front face direction) D12 is once directed to the reference object 200, and then, the radio wave sensor 10 is rotated by a rotation angle of the second angle θ2. Accordingly, the radio wave radiation direction D12 is aligned with the target direction D22. In the cases of the procedure shown in FIG. 10 to FIG. 13, as shown in FIG. 10, the sighting direction of the sighting device 45 is the same as the radio wave radiation direction (front face direction) D12.

Figure 11:
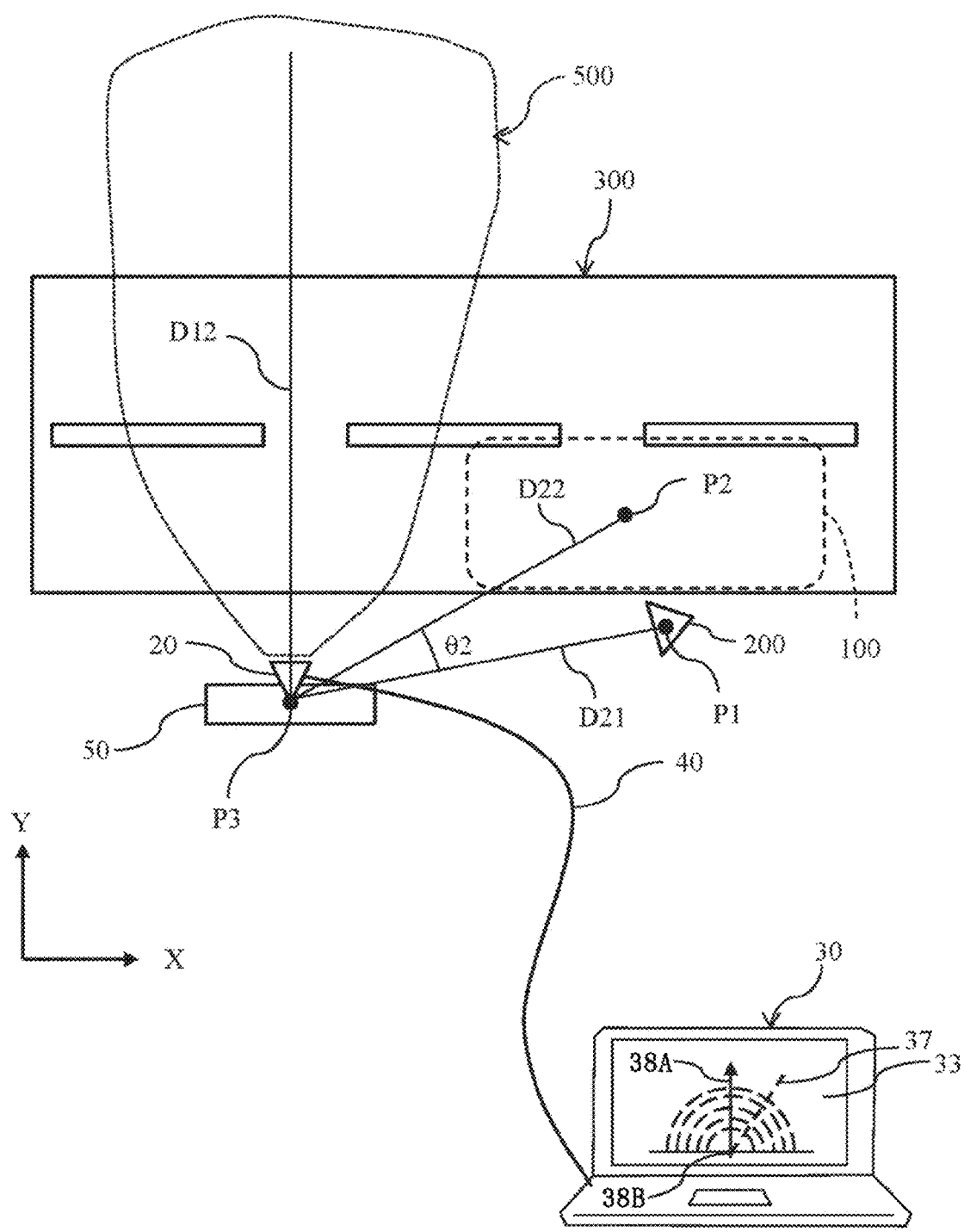
FIG. 11 shows a state where the radio wave sensor before the orientation thereof is adjusted is mounted at the radio wave sensor installation position.

In the procedure shown in FIG. 10 to FIG. 13 as well, step S11 to step S16 in FIG. 3 are performed, whereby mounting of the radio wave sensor 10 (step S15) and installation of the reference object 200 (step S16) are performed. FIG. 11 shows a state where step S15 and step S16 have been completed.

In the subsequent adjustment of the orientation of the radio wave sensor 10 (step S17), the worker aligns the radio wave radiation direction D12 with the direction (the reference direction D21) of the reference object 200. This work may be performed by using the sighting device 45 shown in FIG. 10, or may be performed with reference to the display 33 of the adjustment device 30.

Figure 12:
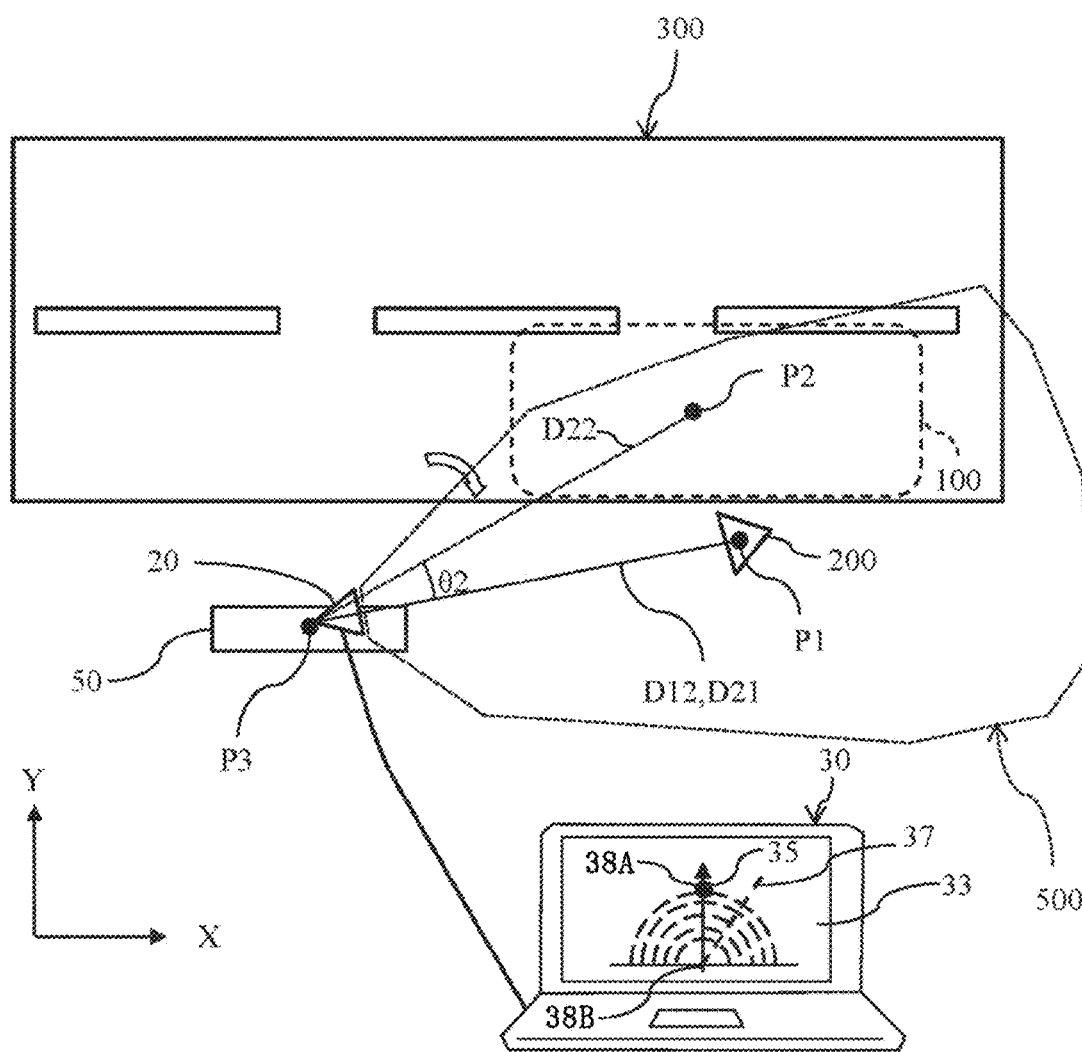
FIG. 12 shows a state where the front face direction of the radio wave sensor is directed to a reference direction.
Figure 13:
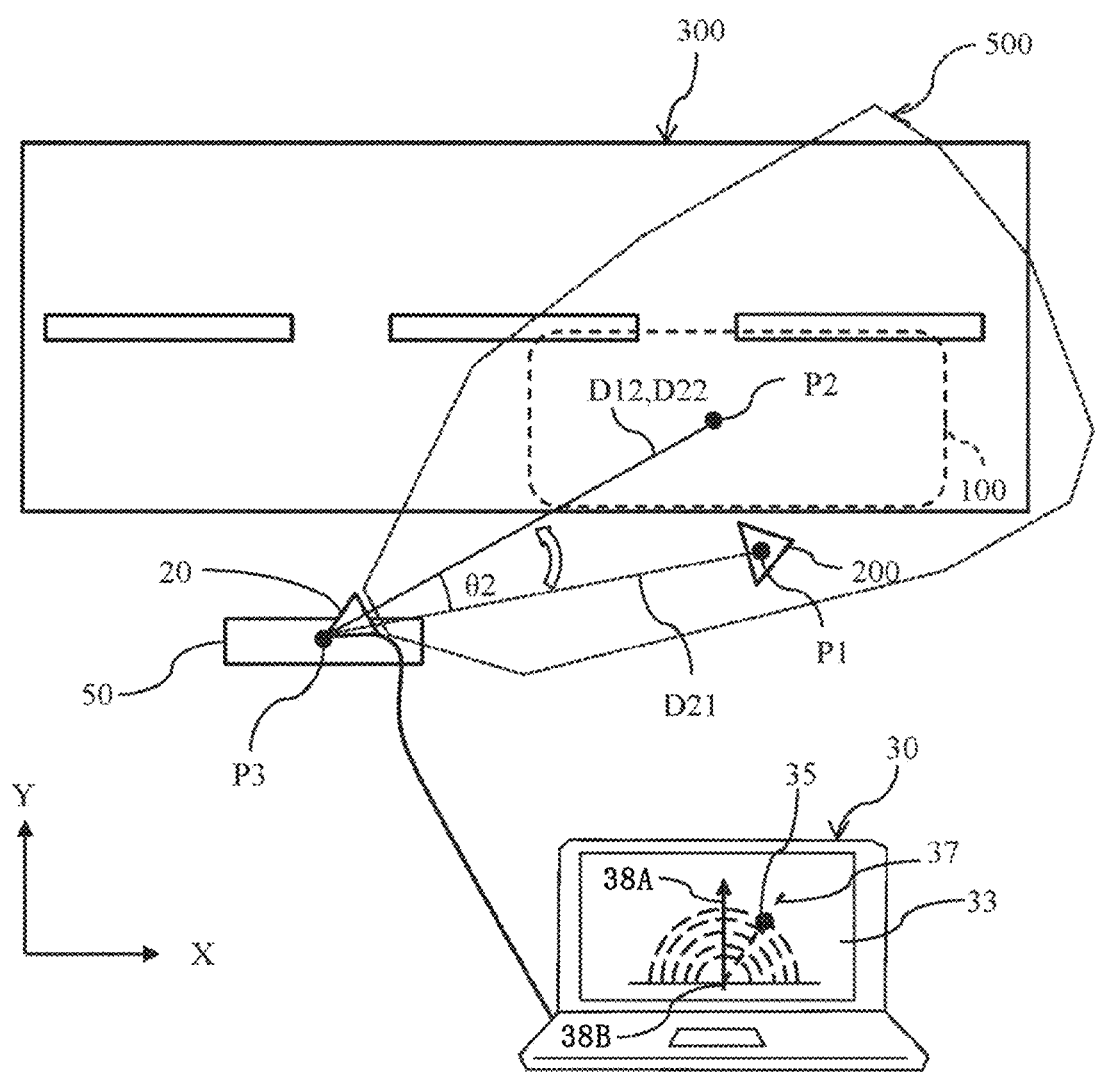
FIG. 13 shows the radio wave sensor of which the orientation has been adjusted.

Here, the reference direction D21 is a direction that has the second angle θ2 (θ2 is +10° clockwise about the position P3, for example) with respect to the target direction D22. That the reference direction D21 is a direction that has the second angle θ2 with respect to the target direction D22 is known. Therefore, when the radio wave sensor 10 is rotated counterclockwise by a rotation angle of the second angle θ2, the radio wave radiation direction D12 can be aligned with the target direction D22 (see FIG. 13). That is, the rotation angle (adjustment angle) when rotating the radio wave radiation direction of the radio wave sensor 10 in order to realize the state of FIG. 13 from the state of FIG. 12 is an angle that has a magnitude that corresponds to the second angle θ2.

In the procedure shown in FIG. 10 to FIG. 13 as well, the orientation of the radio wave sensor 10 is adjusted, using the reference object 200 installed outside the target area 100 as a reference.

The disclosed embodiment is illustrative in all aspects and should not be recognized as being restrictive. The scope of the present disclosure is defined by the scope of the claims rather than the above-described meaning, and is intended to include meaning equivalent to the scope of the claims and all modifications within the scope.

REFERENCE SIGNS LIST 10 radio wave sensor
20 radio wave sensor body
21 transmission antenna
21A antenna element
21B antenna element
22 reception antenna
22A antenna element
22B antenna element
22C antenna element
22D antenna element
23 transmission/reception circuit
24 signal processing circuit
25 interface
26 housing
27 front face
30 adjustment device
31 processor
32 memory
33 display
35 mark of radio wave reflection position of reference object
37 mark of adjustment direction
38A mark of radio wave radiation direction
38B mark of radio wave sensor installation position
39A display of difference between adjustment direction and direction of radio wave reflection position
39B display of reflection power
40 cable
45 sighting device
46 rear sight
47 first front sight
48 second front sight
49 third front sight 50 support
100 target area
200 reference object
300 road
301 lane
302 lane
311 road outer side
312 road outer side
350 arc
500 detectable range
600 radio wave
D11 adjustment direction
D12 radio wave radiation direction
D21 reference direction
D22 target direction
D31 first sighting direction
D32 second sighting direction
D33 third sighting direction
L1 first distance
L2 second distance
P1 reference object installation position
P2 base position in target area
P3 radio wave sensor installation position
θ1 first angle
θ2 second angle

The invention claimed is:

1. A method for installing a radio wave sensor configured to radiate a radio wave to a range including a target area that is set for detection of an object, the method comprising:
a step of installing a reference object; and
a step of adjusting a radio wave radiation direction of the radio wave sensor by rotating the radio wave sensor, using the reference object as a reference, wherein:
the reference object is installed at a first position outside the target area,
the step of adjusting the radio wave radiation direction includes aligning an adjustment direction having a first angle with respect to the radio wave radiation direction, with a reference direction extending from the radio wave sensor toward the reference object, and
the first angle is identical to a second angle between the reference direction and a target direction extending from the radio wave sensor toward a second position in the target area, such that:
the step of adjusting the radio wave radiation direction includes:
aligning the radio wave radiation direction with the reference direction, and
rotating the radio wave radiation direction after having aligned the radio wave radiation direction with the reference direction, thereby aligning the radio wave radiation direction with the target direction extending from the radio wave sensor toward the second position, wherein
a rotation angle when rotating the radio wave radiation direction has a magnitude that corresponds to an angle between the reference direction and the target direction.

2. The method for installing the radio wave sensor according to claim 1, wherein
a first distance from the radio wave sensor to the first position is a distance identical to a second distance from the radio wave sensor to a second position in the target area.

3. The method for installing the radio wave sensor according to claim 2, wherein
the step of adjusting the radio wave radiation direction includes adjusting an elevation angle of the radio wave sensor on the basis of a radio wave reflection power from the reference object.

4. The method for installing the radio wave sensor according to claim 1, wherein
the step of adjusting the radio wave radiation direction further includes displaying, on a screen, a radio wave reflection position of the reference object and the adjustment direction.

5. The method for installing the radio wave sensor according to claim 1, wherein
the step of adjusting the radio wave radiation direction further includes outputting, performed by a device configured to calculate a difference between the adjustment direction and a direction of a radio wave reflection position of the reference object, information regarding the difference via a user interface.

6. The method for installing the radio wave sensor according to claim 1, wherein
the aligning of the adjustment direction with the reference direction includes aligning a sight of a sighting device provided to the radio wave sensor, with the reference object, and
the adjustment direction is identical to a sighting direction of the sighting device.

7. The method for installing the radio wave sensor according to claim 1, wherein
the target area is set in a range including a lane for vehicle traveling, and
the reference object is installed outside the lane in which the target area is set.

8. The method for installing the radio wave sensor according to claim 1, wherein
the target area is set in a range including a road for vehicle traveling, and
the reference object is installed outside the road.

9. The method for installing the radio wave sensor according to claim 8, wherein
the radio wave sensor is installed on one outer side out of both outer sides at left and right of the road, and
the reference object is installed on the one outer side.

10. The radio wave sensor that is installed according to the method of claim 1, the radio wave sensor comprising:
a housing of the radio wave sensor;
a sighting device having a sighting direction that has an angle with respect to a radio wave radiation direction of the radio wave sensor, wherein
the sighting direction is a direction extending from the radio wave sensor toward a position outside the target area, when the radio wave radiation direction is directed to the target area.

11. An adjustment device for adjusting a radio wave radiation direction of the radio wave sensor installed according to the method of claim 1, by rotating the radio wave sensor that is configured to radiate a radio wave to an inside and an outside of a target area that is set for detection of an object, the adjustment device comprising:
a display configured to display a screen including a first image that indicates a radio wave reflection position of a reference object installed outside the target area and that is to be used for adjustment of the radio wave radiation direction, and a second image indicating an adjustment direction; and
a controller configured to execute an operation of setting the adjustment direction, wherein:

the adjustment direction is a direction that has a first angle with respect to the radio wave radiation direction, the first angle is an angle identical to a second angle between a reference direction extending from the radio wave sensor toward the reference object and a target direction extending from the radio wave sensor toward a second position in the target area, the second position is a position determined by an operator based on the target area, the reference direction is a direction determined by the operator based on an installation position for installing the radio wave sensor, the second position, and the second angle, and the adjusting of the radio wave radiation direction includes:
  aligning the radio wave radiation direction with the reference direction, and
  rotating the radio wave radiation direction after having aligned the radio wave radiation direction with the reference direction, thereby aligning the radio wave radiation direction with the target direction extending from the radio wave sensor toward the second position, wherein a rotation angle when rotating the radio wave radiation direction has a magnitude that corresponds to an angle between the reference direction and the target direction.

12. The adjustment device according to claim 11, wherein the controller is configured to calculate a difference between the adjustment direction and a direction of the radio wave reflection position, and to output information regarding the difference via a user interface.

* * * * *